United States Patent [19]
Hoyt et al.

[11] Patent Number: 5,611,379
[45] Date of Patent: Mar. 18, 1997

[54] ENLARGED IRON COVER

[76] Inventors: David Hoyt, 1136 W. 135th St., Gardena, Calif. 90247; Gary T. Aldcroft, 3717 California Ave., Long Beach, Calif. 90807

[21] Appl. No.: 434,517

[22] Filed: May 4, 1995

[51] Int. Cl.⁶ .......................... A63B 57/00; B65D 65/08
[52] U.S. Cl. ........................ 150/160; 206/315.4
[58] Field of Search ............... 206/315.4; 150/160, 150/159; 273/194 B, 32 E, 32 R

[56] References Cited

U.S. PATENT DOCUMENTS

| | | | |
|---|---|---|---|
| 1,957,577 | 5/1934 | Chapman | 150/160 |
| 2,035,529 | 3/1936 | Bucklin | 150/160 |
| 2,116,655 | 5/1938 | Berrittella | 273/194 B |
| 2,526,985 | 10/1950 | Whitehead | 150/160 |
| 2,608,409 | 8/1952 | Pinkerton | 273/194 B |
| 2,705,039 | 3/1955 | Halter | 150/160 |
| 4,213,614 | 7/1980 | Philippi | 150/160 X |
| 5,105,863 | 4/1992 | Cirone | 150/160 |
| 5,117,884 | 6/1992 | Diener et al. | 150/160 |
| 5,345,987 | 9/1994 | Hagar | 150/160 |
| 5,415,213 | 5/1995 | Diener | 150/160 |

Primary Examiner—Sue A. Weaver
Attorney, Agent, or Firm—J. E. Brunton

[57] ABSTRACT

A head cover for an iron golf club has an enlarged cover section which fits over the head of irons of different sizes. The cover section includes an internal cavity with an enlarged open mouth through which the head passes upon placing the cover section over the head and a protector section which covers at least partially the hosel member of the shaft when the head is received within the cavity. A clip near the open mouth expands with the shaft of the iron golf club being pushed into the cavity and retracts to hold the shaft when the head is received within the cavity.

6 Claims, 1 Drawing Sheet

ENLARGED IRON COVER

BACKGROUND OF THE INVENTION

1. Field of the Invention

This invention relates to a cover for the head of an iron golf club.

2. Background Discussion

Covers for irons are popular, but they usually only protect the face of the iron. It is desirable to extend the cover along the shaft of the iron so that it covers the hosel member of the shaft. U.S. Pat. No. 5,117,884 illustrates an iron cover which is designed to cover the hosel member of the shaft in addition to the head of the iron. It is also desirable to have the cover fit all sizes of irons, that is, from the One Iron through the Wedge. This requires the use of an enlarged open mouth through which the head of the iron passes when the cover is placed on the iron. As a consequence of protecting the hosel member and using an enlarged open mouth, it is difficult to retain the cover in position on the head of the iron, so that it does not accidentally fall off during use.

SUMMARY OF THE INVENTION

It is the objective of this invention to provide a cover for an iron golf club which fits all the different sized irons, protects the hosel member of the shaft of the iron, and is retained in position until manually removed by the golfer.

The iron cover of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include protection of the hosel member, and fitting all sized irons.

The first feature of the head cover of this invention is that it includes an enlarged cover section which fits over the head of irons of different sizes. The cover section has an internal cavity with an enlarged open mouth through which the head of the iron passes upon placing the cover section over the head and a protector section which covers, at least partially and preferably substantially all, the hosel member when the head is received within the cavity.

The second feature is a clip member near the open mouth and the protector section which expands with the shaft of the iron golf club being pushed into the cavity and retracts to hold the shaft when the head is received within the cavity. The clip member is preferably on the exterior of the protector section adjacent the open mouth. There is a retainer member which holds the clip member in position. The clip member includes a base having opposed ends and a pair of legs. Each leg extends outward in the same direction from an end of the base, so that it has a generally U-shaped configuration.

The third feature is that the protector section has a pair of opposed openings near the open mouth and the clip member has a pair of pin elements. Each pin element extends through one of the openings, and the shaft engages the pin elements to expand the clip member when the shaft is pushed into the cavity.

DESCRIPTION OF THE DRAWING

The preferred embodiment of this invention, illustrating all its features, will now be discussed in detail. This embodiment depicts the novel and non-obvious iron cover of this invention as shown in the accompanying drawing, which is for illustrative purposes only. This drawing includes the following figures (FIGS.), with like numerals indicating like parts.

DETAILED DESCRIPTION OF THE PREFERRED EMBODIMENT

Figure 1:
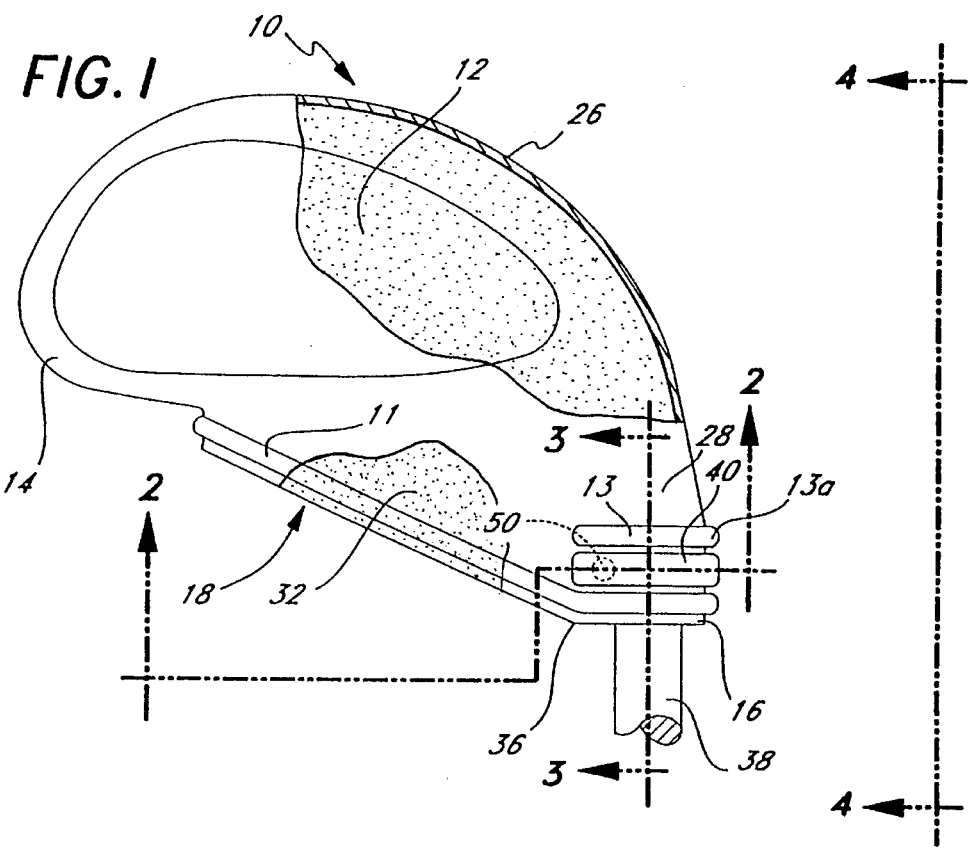
FIG. 1 is a is a side elevational view of the iron cover of this invention.
Figure 2:
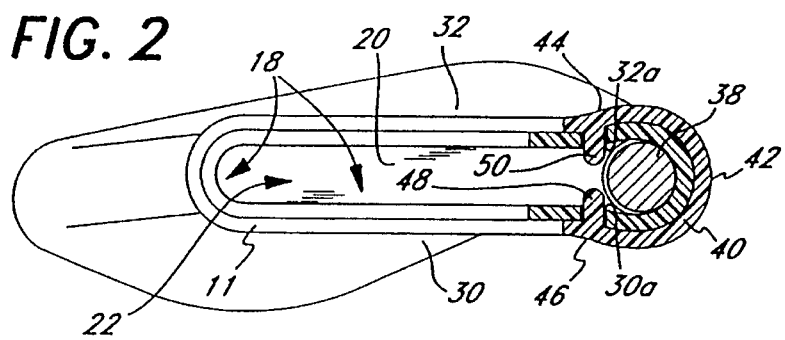
FIG. 2 is a cross-sectional view taken along line 2—2 of FIG. 1.
Figure 3:
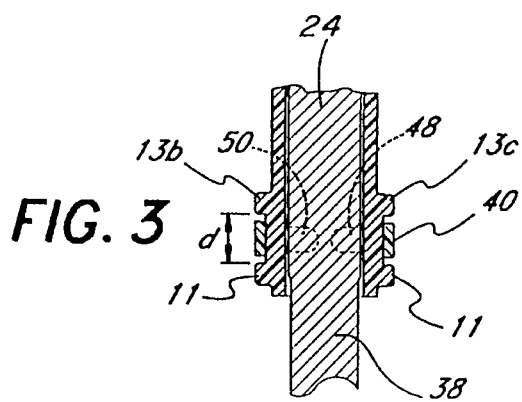
FIG. 3 is a cross-sectional view taken along line 3—3 of FIG. 1.
Figure 4:
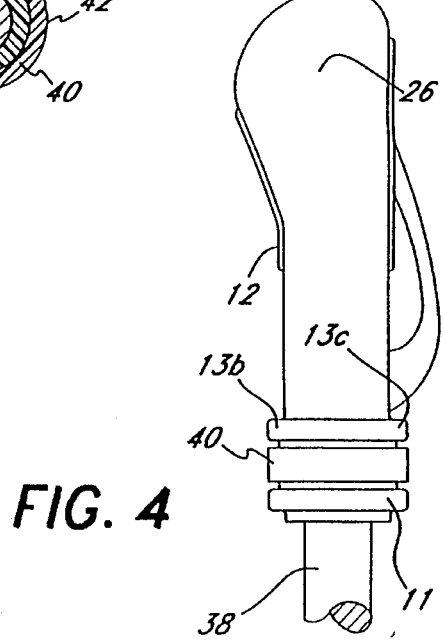
FIG. 4 is a cross-sectional view taken along line 4—4 of FIG. 1.

As depicted in FIGS. 1 through 3, the iron cover 10 of this invention includes an enlarged cover section 12 which has a forward end 14, a rear end 16, a back side 26 extending between the forward and rear ends, opposed side walls 30 and 32 connected to the back side, and an enlarged, elongated open mouth 18 extending between the forward and rear ends. An iron 20 (only partially shown) is received within an enlarged cavity 22 within the cover section 12. Thus, the head of the iron 20 is completely covered when the iron cover 10 is placed on the head of the iron. There is a collar 11 along the perimeter of the open mouth that circumscribes the open mouth, and a U-shaped flange 13 that is spaced from the collar a short distance d. The U-shaped flange 13 has a base 13a which extends over the back side 26, and a pair of opposed legs 13b and 13c which, respectively, extend over the side walls 30 and 32. In each side wall 30 and 32 is an opening 30a and 32a, respectively. These openings 30a and 32a are directly opposed to each other.

In accordance with one feature of this invention, the cover section 12, and the cavity 22 within this section, are large enough to accept irons of different sizes, so that one size cover 10 fits all sizes of irons. The open mouth 18 is sufficiently large so that the irons easily pass through the open mouth 18 into the cavity 22. Typically, the open mouth 18 is longer that it is wide, and has a length of from about 2 to about 4 inches. The cover section 12 is preferably made using conventional slush moulding techniques from a polymeric material such as, for example, polyvinyl chloride. This gives the cover section 12 flexibility.

In accordance with another feature of this invention, the hosel member 24 of the iron 20 is covered. In the preferred embodiment depicted, the entire hosel member 24 is covered, although in some embodiments of this invention it may only be partially covered. To provide this feature, the cover section 12 includes a hosel protector section 28. The hosel protector section 28 comprises the back side 26 of the cover section 12 adjacent the rear end 16, and the lower portions of the side walls 30 and 32 of the cover section 12. The rear end 16 is lower than the forward end 14 as viewed in FIG. 1, and the open mouth 18 extends along a straight, but slanting, line between the forward end 14 and an intermediate point 36 that is below the lower end of the hosel member 24 when the head of the iron 20 is lodged within the cavity 22 of the cover 10. The open mouth 18 then extends along a straight between the intermediate point 36 and the rear end 16. The distance between the intermediate point 36 and the rear end 16 is relatively short compared to the total length of the open mouth, and is only about twice the diameter of the shaft 38 of the iron 20. Typically, this distance between the intermediate point 36 and the rear end 16 is from about 0.50 to about 1 inch.

In order to prevent the cover 10 from slipping off the head of the iron 20, a clip 40 is employed to hold the cover to the iron. This clip 40 has a base 42 having opposed ends with a leg 44 and 46, respectively, at each end. Each leg 44 and 46 extends outward in the same direction from the ends of the base 42. Thus, the clip 40 has a generally U-shaped configuration. There are a pair of pins 48 and 50 at each the end of the legs 44 and 46 that point inward towards each other. The clip 40 fits over the exterior of the cover section 12 near the rear end 16, and it is held in position by a portion of the collar 11 between the intermediate point 36 and the rear end 16 and the U-shaped flange 13. The width of the clip 40 is slightly less than the distance d. Thus, the portion of the collar 11 between the intermediate point 36 and the rear end 16 and the U-shaped flange 13 serve as a retainer that prevents the clip 40 from moving up and down along the back side 26 of the cover section 12. The clip 40 is on the exterior of the cover 10, and the pins 48 and 50 slip into the openings 30a and 32a when they are aligned with these openings. The clip 40 is spring biased, so that when the head of the iron 20 is inserted into the open mouth 18, the shaft 38, or the hosel member 24 which is part of the shaft, engages the pins 48 and 50 to expand the clip 40, pushing the legs 44 and 46 apart. As soon as the shaft 38 passes the pins 48 and 50, the clip 40 returns to its normal condition shown in FIG. 2. Thus, the cover 10 is held by the clip 40 to the shaft 38.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

We claim:

1. A head cover for an iron golf club which has a head connected to a shaft by a hosel member, said head cover including an enlarged cover section which fits over the head of irons of different sizes, said cover section having an internal cavity with an enlarged open mouth through which the head passes upon placing the cover section over said head and a protector section which covers at least partially the hosel member when the head is received within the cavity, said protector section having at least one opening therethrough, and means defining a clip connected to said covet section near the open mouth for expanding with the shaft of the iron golf club as the shaft is pushed into the cavity and for then retracting to hold the shaft when the head is received within the cavity, said means defining a clip having at least one element extending inwardly of said cover section through said opening.

2. The head cover of claim 1 where the means defining a clip includes a base having opposed ends and a pair of legs, each leg extending outward in the same direction from each one of said ends of the base.

3. The head cover of claim 1 where the means defining a clip has a generally U-shaped configuration.

4. A head cover for an iron golf club which has a head connected to a shaft by a hosel member, said head cover including an enlarged cover section which fits over the head of irons of different sizes, said cover section having an internal cavity with an enlarged open mouth through which the head passes upon placing the cover section over said head and a protector section which covers at least partially the hosel member when the head is received within the cavity, said protector section having a pair of opposed openings near the open mouth, and means defining a clip connected to said cover section for expanding as the shaft of the iron golf club is pushed into the cavity and for then retracting to hold the shaft when the head is received within the cavity, said means defining a clip having a pair of pin elements, each pin element extending inwardly through one of said openings, said shaft engaging the pin elements to expand the clip member when the shaft of the iron golf club is pushed into the cavity.

5. A head cover for an iron golf club which has a head connected to a shaft by a hosel member, said head cover including:

an enlarged cover section which fits over the head for irons of different sizes, said enlarged cover section and having a forward end, a rear end, an internal cavity with an enlarged open mouth through which the head passes upon placing the cover section over said head, a side wall extending between the forward and rear ends, and a protector section which covers substantially all the hosel member when the head is received within the cavity, said protector section having a pair of opposed openings near the mouth and being between the forward and rear ends near the rear end along the side wall of the cover section, said open mouth extending between the forward end and rear end and having a length substantially longer than it width, and means defining a generally U-shaped clip connected to said cover section near the open mouth and on the exterior of the protector section for expanding as the shaft of the iron golf club is pushed into the cavity and for then retracting to hold the shaft when the head is received within the cavity, said means defining a generally U-shaped clip having a pair of pin elements, each pin element extending inwardly through one of said openings, said shaft engaging the pin elements to expand said means defining a generally U-shaped clip when the shaft of the iron golf club is pushed into the cavity.

6. A head cover for an iron golf club which has a head connected to a shaft by a hosel member, said head cover including:

an enlarged cover section which fits over the head of irons of different sizes, said cover section having
   (i) an internal cavity with an enlarged, elongated open mouth through which the head passes upon placing the cover section over said head, and
   (ii) a protector section which covers substantially all the hosel member when the head is received within the cavity, said protector section having a pair of opposed openings near the mouth and including a pair of spaced apart raised members, and means defining a clip connected to said cover section near the open mouth on the exterior of the protector section between said raised members for expanding when the shaft of the golf club is pushed into the cavity and for then retracting to hold the shaft when the head is received within the cavity, said means defining a clip having a base from which extend a pair of legs so that said means defining a clip has a generally U-shaped configuration, said means defining a clip further including a pair of pin elements, each pin element projecting from one leg and extending inwardly through one of said openings said shaft engaging the pin elements to expand said means defining a clip when the shaft of the iron golf club is pushed into the cavity.

* * * * *